US012615411B2

(12) United States Patent
Stockhammer et al.

(10) Patent No.: US 12,615,411 B2
(45) Date of Patent: Apr. 28, 2026

(54) DYNAMIC RESOLUTION CHANGE HINTS FOR ADAPTIVE STREAMING

(71) Applicant: QUALCOMM Incorporated, San Diego, CA (US)

(72) Inventors: Thomas Stockhammer, Bergen (DE); Imed Bouazizi, Frisco, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 59 days.

(21) Appl. No.: 18/709,617

(22) PCT Filed: Jan. 3, 2023

(86) PCT No.: PCT/US2023/060016
§ 371 (c)(1),
(2) Date: May 13, 2024

(87) PCT Pub. No.: WO2023/133365
PCT Pub. Date: Jul. 13, 2023

(65) Prior Publication Data
US 2025/0008182 A1     Jan. 2, 2025

Related U.S. Application Data

(63) Continuation of application No. 17/647,435, filed on Jan. 7, 2022, now Pat. No. 11,943,501.

(51) Int. Cl.
*H04N 21/44* (2011.01)
*H04N 19/154* (2014.01)
(Continued)

(52) U.S. Cl.
CPC ........... *H04N 21/44* (2013.01); *H04N 19/154* (2014.11); *H04N 19/33* (2014.11); *H04N 19/423* (2014.11);
(Continued)

(58) Field of Classification Search
CPC ...... H04N 21/44; H04N 19/154; H04N 19/33; H04N 19/423; H04N 21/4331;
(Continued)

(56) References Cited

U.S. PATENT DOCUMENTS

| | | |
|---|---|---|
| 5,847,771 A | 12/1998 | Cloutier et al. |
| 5,859,950 A | 1/1999 | Iwamoto |
(Continued)

FOREIGN PATENT DOCUMENTS

| | | |
|---|---|---|
| EP | 3934258 A1 | 1/2022 |
| WO | 2019156466 A1 | 8/2019 |
| WO | 2021007239 A1 | 1/2021 |

OTHER PUBLICATIONS

ETSI TS 101 154 V2.4.1, "Digital Video Broadcasting (DVB); Specification for the use of Video and Audio Coding in Broadcast and Broadband Applications", Feb. 2018, pp. 1-291.
(Continued)

*Primary Examiner* — Susan E. Hodges
(74) *Attorney, Agent, or Firm* — Shumaker & Sieffert, P.A.

(57) ABSTRACT

An example device for retrieving media data includes a memory configured to store video data; a video decoder configured to decode the video data; and one or more processors implemented in circuitry and configured to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to the video decoder; receive a second portion of the second video data at the second spatial resolution for a second playback time later than the first
(Continued)

playback time; and send the second portion of the second video data at the second spatial resolution to the video decoder.

32 Claims, 6 Drawing Sheets

(51) Int. Cl.
*H04N 19/33* (2014.01)
*H04N 19/423* (2014.01)
*H04N 21/433* (2011.01)
*H04N 21/435* (2011.01)

(52) U.S. Cl.
CPC ....... *H04N 21/4331* (2013.01); *H04N 21/435* (2013.01)

(58) Field of Classification Search
CPC .......... H04N 21/435; H04N 21/23424; H04N 21/8456; H04N 21/85; H04N 21/218; H04N 21/440263; H04N 21/4433; H04N 21/4621
USPC ....................................................... 386/353
See application file for complete search history.

(56) References Cited

U.S. PATENT DOCUMENTS

| | | | |
|---|---|---|---|
| 8,385,427 | B2 | 2/2013 | Bhattacharya et al. |
| 9,538,120 | B2 | 1/2017 | Greene et al. |
| 10,887,600 | B2 | 1/2021 | Liu et al. |
| 11,057,446 | B2 * | 7/2021 | Shribman ............... H04L 67/02 |
| 11,076,188 | B1 | 7/2021 | Purushe |
| 11,765,444 | B2 | 9/2023 | Stockhammer et al. |
| 11,943,501 | B2 | 3/2024 | Stockhammer et al. |
| 2009/0274450 | A1 | 11/2009 | Ishii |
| 2018/0288500 | A1 * | 10/2018 | Stockhammer ......... H04L 65/65 |
| 2019/0319757 | A1 | 10/2019 | Manolakos et al. |
| 2020/0221474 | A1 | 7/2020 | Lee et al. |
| 2021/0409796 | A1 * | 12/2021 | McGilvray ...... H04N 21/23439 |
| 2022/0124281 | A1 | 4/2022 | Cui et al. |

OTHER PUBLICATIONS

Fielding R., et al., "Hypertext Transfer Protocol—HTTP/1.1", Network Working Group, Request for Comments, RFC 2616, Standards Track, Jun. 1999, pp. 1-114.
International Search Report and Written Opinion—PCT/US2020/063816—ISA/EPO—Jan. 14, 2022 16 Pages.
International Search Report and Written Opinion—PCT/US2023/060016—ISA/EPO—Mar. 21, 2023 10 Pages.
ISO/IEC JTC 1/SC 29/WG 03: "Text of ISO/IEC 23009-1 4th Edition DAM 2 Alternative MPD Event, Nonlinear Playback and Other Extensions", ISO/IEC JTC 1/SC 29/WG 03 N0459, Feb. 5, 2022, 43 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Outters J., "Commercial Requirements for Next Generation Video Codecs", DVB CM-AVC Group, Stable Draft of V&V Requirements for CM Approval, Apr. 12, 2020, pp. 1-39.
Qualcomm Incorporated: "Potential Techniques for Coverage Enhancements", 3GPP TSG-RAN WG1 Meeting #101, R1-2004499, 3rd Generation Partnership Project, Mobile Competence Centre, 650, Route Des Lucioles, F-06921 Sophia-Antipolis Cedex, France, vol. RAN WG1. No. e-Meeting, May 25, 2020-Jun. 5, 2020, May 16, 2020, XP052345877, 15 Pages, XP051886228, section 4.

* cited by examiner

DYNAMIC RESOLUTION CHANGE HINTS FOR ADAPTIVE STREAMING

This application is a U.S. National Stage entry under 35 U.S.C. § 371 of International Application No. PCT/US2023/060016, filed Jan. 3, 2023, which claims priority to and the benefit of U.S. patent application Ser. No. 17/647,435, filed Jan. 7, 2022, the entire contents of which are incorporated herein by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for streaming video data having varying spatial resolutions. In particular, two or more representations may be included in a switching set, where the representations may include segments having different encoded spatial resolutions. For example, one representation may include encoded video data at 4K resolution (3840×2160), while another representation may include encoded video data at 1080p resolution (1920×1080). A client device may determine quality values for time-aligned segments of the various representations and retrieve the segment having the higher quality value.

In one example, a method of retrieving video data includes determining that a media presentation includes first video data at a first spatial resolution and second video data at a second spatial resolution, the second spatial resolution being different than the first spatial resolution; receiving a first portion of the first video data at the first spatial resolution for a first playback time; sending the first portion of the first video data at the first spatial resolution to a video decoder; receiving a second portion of the second video data at the second spatial resolution for a second playback time later than the first playback time; and sending the second portion of the second video data at the second spatial resolution to the video decoder.

In another example, a device for retrieving video data includes a memory configured to store video data; a video decoder configured to decode the video data; and one or more processors implemented in circuitry and configured to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to the video decoder; receive a second portion of the second video data at the second spatial resolution for a second playback time later than the first playback time; and send the second portion of the second video data at the second spatial resolution to the video decoder.

In another example, a computer-readable storage medium has stored thereon instructions that, when executed, cause a processor to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to a video decoder; receive a second portion of the second video data at the second spatial resolution for a second playback time later than the first playback time; and send the second portion of the second video data at the second spatial resolution to the video decoder.

In another example, a device for retrieving video data includes means for determining that a media presentation includes first video data at a first spatial resolution and second video data at a second spatial resolution, the second spatial resolution being different than the first spatial resolution; means for receiving a first portion of the first video data at the first spatial resolution for a first playback time; means for sending the first portion of the first video data at the first spatial resolution to a video decoder; means for receiving a second portion of the second video data at the second spatial resolution for a second playback time later than the first playback time; and means for sending the second portion of the second video data at the second spatial resolution to the video decoder.

The details of one or more examples are set forth in the accompanying drawings and the description below. Other features, objects, and advantages will be apparent from the description and drawings, and from the claims.

DETAILED DESCRIPTION

Figure 1:
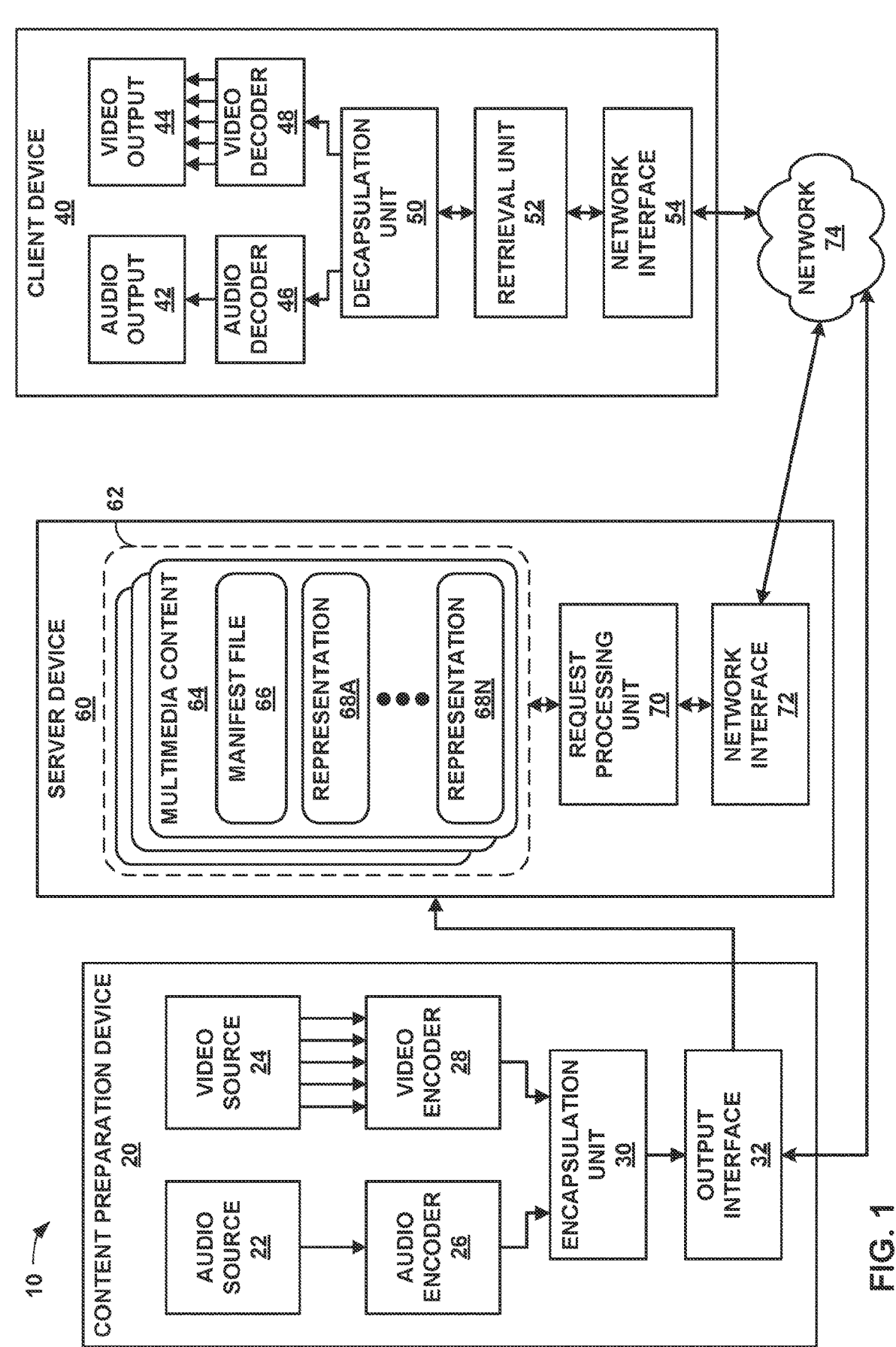
FIG. 1 is a block diagram illustrating an example system that implements techniques for streaming media data over a network.

In general, this disclosure describes techniques for dynamically switching between video resolutions when streaming video data. Streaming video data may be performed via unicast, broadcast, or multicast protocols. For example, Hypertext Transfer Protocol (HTTP) may be used to stream video data according to, e.g., Dynamic Adaptive Streaming over HTTP (DASH), HTTP Live Streaming (HLS), or other such protocols. As another example, broadcast or multicast protocols, such as enhanced Multimedia Broadcast Multicast Service (eMBMS), File Delivery over Unidirectional Transport (FLUTE), Real-time Object-delivery over Unidirectional Transport (ROUTE), Real-time Transport Protocol (RTP), Real Time Streaming Protocol (RTSP), or the like, may be used to deliver video data. Broadcast may also be performed over-the-air (OTA) via, e.g., radiowaves. In some examples, a broadcast or multicast protocol may deliver DASH or HLS formatted video data, such that a middleware unit of a client device may act as a client with respect to the broadcast or multicast session and as a proxy client to a DASH or HLS client.

Digital Video Broadcasting (DVB) is a group of standards related to digital television. Standards for DVB are currently being developed for next generation video codecs. Document CM-AVC0620 for DVB provides the "Draft Commercial Requirements for Next Generation Video Codecs." While the main objective of the work item addresses the addition of new codecs beyond existing codecs in TS 101 154 (MPEG-2 video, H.264/AVC, VC-1, H.265/HEVC), the commercial requirements also address new formats and new ways of encoding and consuming these formats.

A draft of TS 101 154 mentions the possibility of dynamic changes of resolution only in the case of reference picture resampling using ITU-T H.266/Versatile Video Coding (VVC) coding standard. The use of a dynamic resolution for the encoding of contents has been used with existing codecs and is deployed by some streaming services for video on demand (VOD) streaming services. This disclosure recognizes that dynamic resolution of video data may also be deployed for live streaming or broadcast services.

This disclosure describes techniques related to dynamic resolution changes that may be used for new encoding schemes. These techniques also allow for seamless resolution upscaling of decoded pictures in the MPEG-2 Systems layer of Integrated Receiver Decoders (IRDs) or in the rendering engine of displays (e.g., televisions). The resolution may change dynamically at sequence parameter set (SPS) boundaries, even without reference picture resampling, or within a sequence when reference picture resampling is used in VVC. These techniques may be employed in future codecs beyond VVC as well. This disclosure further describes certain constraints that may be applied to limit resolution changes in certain contexts.

In video streaming applications, over-the-top (OTT) players may support a dynamic and seamless resolution change at segment boundaries. That is, in adaptive bitrate (ABR) encoding and streaming schemes, the switch of bitrate profile from one segment to the next may also be accompanied by a change of encoded resolution. Even within a bitrate profile, evolved video on demand (VOD) streaming services can dynamically change the resolution per scene to improve compression efficiency and save bandwidth.

Dynamic resolution encoding tests have been performed on various standards and resolutions. For example, heuristic testing has been performed on ITU-T H.264/Advanced Video Coding (AVC) HD and ITU-T H.265/High Efficiency Video Coding (HEVC) UHD use cases. For H.264/AVC HD, tested resolutions included 1920×1080p. 1280×720p and 960×540p. For H.265/HEVC UHD, tested resolutions included 3840×2160, 250×1440 and 1920×1080. These tests have shown a 20-25% bit rate savings by using lower resolutions on the most temporally complex scenes, yet such bit rate reductions are not perceptible, and the benefits of the highest resolutions can be maintained when needed.

In order for live broadcast applications to compete with streaming of pre-recorded content, it may be important to use benefits of dynamic resolution encoding adaptation for video content that is broadcast live. While video decoders themselves support decoding of dynamic resolution encoded video data, pictures in the video decoder buffer may stay in the encoded resolution, and automatic upscaling to nominal resolution may be the responsibility of the IRD or display in the MPEG-2 Systems layer.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al. Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, content preparation device 20 may prepare a media presentation including multiple representations in a switching set that have different spatial resolutions. For example, representation 68A may have a resolution of 3840×2160 and representation 68N may have a resolution of 1920×1080. Content preparation device 20 may further construct an addressable resource index (ARI) track for the switching set that advertises quality values for segments (or chunks of segments) of representations 68 (e.g., using quality_identifier values of the ARI track). ISO/IEC 23009-1:2021/Amd.1 includes one example definition of the ARI track including the quality_identifier. The quality values may generally represent a metric of quality other than spatial resolution and bitrate, as the bitrates for the two resolutions may be substantially similar or identical (i.e., the same).

Allowing for a higher bitrate for lower resolution video data may, in some cases, yield a higher quality for the lower resolution video data than for higher resolution video data. For example, for a highly dynamic scene involving many changes in global camera perspective, video data encoded at a lower resolution at a given bitrate may have a higher quality than video data encoded at a higher resolution at the same bitrate. That is, when many global camera perspective changes occur for a video sequence, more intra-prediction encoded frames (I-frames) may be required, which may consume a relatively large amount of the bit budget allocated for the scene. An even larger number of bits would be required to encode higher resolution I-frames. Thus, for the same bit budget, more bits would be available for encoding subsequent inter-prediction encoded frames (e.g., P- and B-frames) for the lower resolution video than for the higher resolution video. Thus, a higher overall quality may be expected for such a scene at a lower resolution than at a higher resolution, assuming the same bitrate is used.

Accordingly, retrieval unit 52 of client device 40 may obtain quality values for two segments or chunks corresponding to the same playback time from the two different representations. Retrieval unit 52 may also determine whether the quality value for the segment or chunk of the lower resolution representation is higher than the quality value for the segment or chunk of the higher resolution representation. If the segment or chunk of the lower resolution representation has a higher quality value, retrieval unit 52 may retrieve the segment or chunk of the lower resolution representation and provide the segment or chunk to video decoder 48. On the other hand, if the segment or chunk of the higher resolution representation has a higher quality value, retrieval unit 52 may retrieve the segment or chunk of the higher resolution representation and provide the segment or chunk to video decoder 48. Retrieval unit 52 may similarly analyze quality values for each segment or chunk throughout playback of the media presentation, and thus, may switch between the lower and higher resolution representations at various times.

In other words, for some scenarios, such as H.266/VVC-encoded video data, the benefits of dynamic resolution encoding have been demonstrated by video on demand (VOD) services. This disclosure recognizes that these benefits may be realized using broadcast delivery. That is, according to the techniques of this disclosure, client device 40 may receive a media stream via broadcast and perform resolution changes between two different resolutions of video data included in the media stream, e.g., between representations including different spatial resolutions for encoded video data. For DVB DASH applications, such resolution changes may be supported within a profile at segment boundaries.

This disclosure further recognizes that dynamic resolution changes need not be limited to the usage of reference picture resampling in VVC encoded streams. Likewise, there is not a need to limit changes to being between two encoded resolutions. In some examples, multiple resolutions exceeding two may be supported. For example, a VVC HDR UHDTV-1 IRD may be configured to switch between any resolutions in the following list of resolutions: 3840×2160, 2560×1440, 1920×1080, 1280×720. As another example, a VVC HDR UHDTV-2 IRD may be configured to switch between any resolutions in the following list of resolutions: 7680×4320, 5120×2880, 3840×2160, 2560×1440, 1920× 1080, 1280×720.

This disclosure also recognizes that resolution changes may happen relatively frequently. For example, if picture resolution (e.g., as indicated by values for syntax elements sps_pic_width_in_luma_samples and sps_pic_height_in_luma_samples of picture parameter sets (PPSs)) were to change at each DVB random access point (RAP), two successive changes of picture resolution may happen at a much higher frequency than two seconds worth of playback time. The techniques of this disclosure may also be premised on video decoders being capable of correctly handling resolution changes for input encoded video data, but also upsampling lower resolution video data to a predetermined maximum resolution for display (e.g., a resolution matching a display to which the video data is output). In this manner, displayed video data would have the same resolution, even though input encoded video data may vary in resolution, thereby preventing user observation of resolution changes.

In this manner, client device 40 represents an example of a device for retrieving media data, the device including a memory configured to store video data; a video decoder configured to decode the video data; and one or more processors implemented in circuitry and configured to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to the video decoder; receive a second portion of the second video data at the second spatial resolution for a second playback time later than the first playback time; and send the second portion of the second video data at the second spatial resolution to the video decoder.

Figure 2:
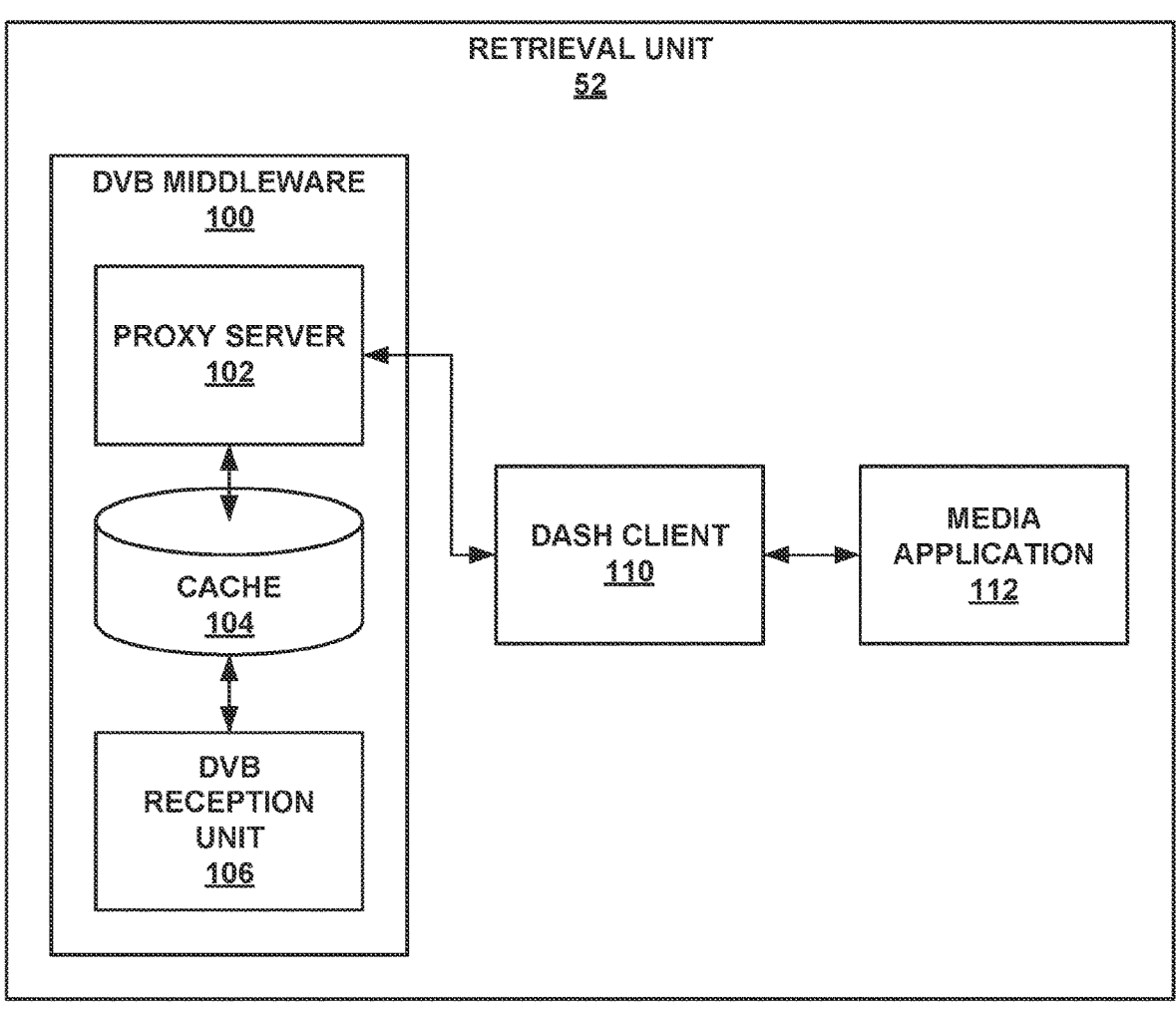
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes digital video broadcast (DVB) middleware unit 100. DASH client 110, and media application 112.

In this example, DVB middleware unit 100 further includes DVB reception unit 106, cache 104, and proxy server unit 102. In this example, DVB reception unit 106 is configured to receive data via DVB. That is, DVB reception unit 106 may receive files via broadcast from, e.g., server device 60, which may act as a DVB broadcast server.

As DVB middleware unit 100 receives data for files (e.g., segments, or chunks thereof). DVB middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner. DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

In accordance with the techniques of this disclosure, DVB reception unit 106 may receive a media presentation including two or more representations having different resolutions. DVB reception unit 106 may also receive an ARI track including quality values for segments or chunks of the representations. DVB reception unit 106 may store the received segments or chunks to cache 104. DASH client 110 may retrieve the data of the ARI track via proxy server unit 102 and determine, for a given playback time, which segment or chunk has a higher quality value, then retrieve the segment or chunk having the higher quality value for that playback time.

Figure 3:
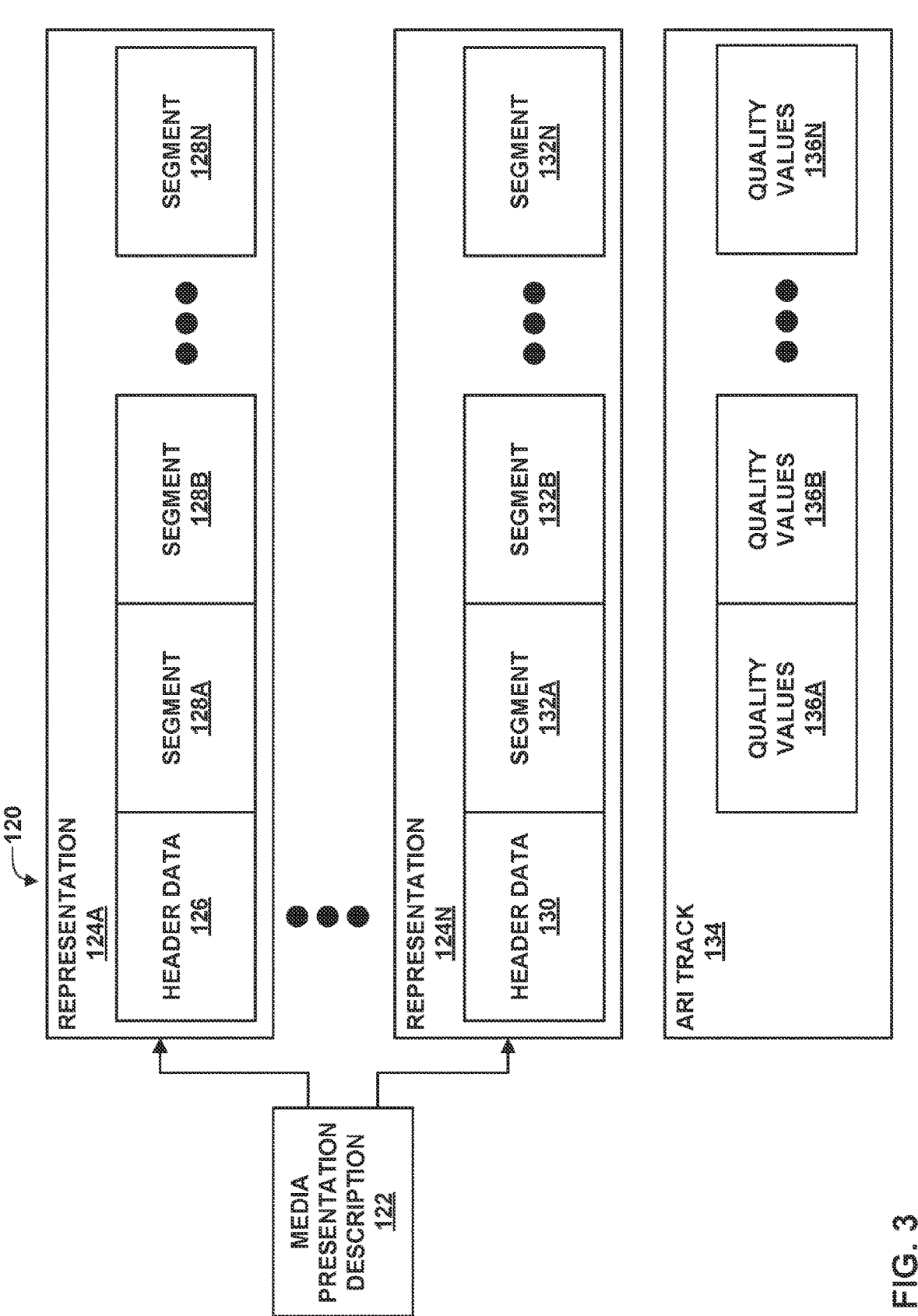
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122, a plurality of representations 124A-124N (representations 124), and addressable resource information (ARI) track 134. Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

ARI track 134 includes, among other things, quality values 136A-136N (quality values 136). In general, quality values 136 include values representing qualities for corresponding (i.e., playback time aligned) segments of representations 124. Thus, for example, quality values 136A include quality values for segments 128A and 132A, quality values 136B include quality values for segments 128B and 132B, and quality values 136A include quality values for segments 128N and 132N.

In accordance with the techniques of this disclosure, representation 124A may include video data at a first resolution (e.g., 4K) and representation 124N may include video data at a second, different resolution (e.g., 1080p). Representations 124A and 124N may have similar or identical bitrates. Thus, aligned segments 128 and 132 may have similar or identical bitrates. For example, segment 128A and segment 132A may have similar or identical bitrates, but include video data encoded at different resolutions.

Some of segments 124 may have higher qualities, as indicated by quality values 136, than corresponding segments 132 (at a lower spatial resolution). However, in some cases, one or more of segments 132 may have higher quality values than corresponding segments 124 as indicated by quality values 136. Thus, client device 40 (FIG. 1) may determine which segment of a given set of corresponding segments has a higher quality value, using quality values 136, and retrieve the one of segments 124, 132 having the higher quality value. For example, if quality values 136A indicate that segment 124A has a higher quality value than segment 132A, client device 40 (or retrieval unit 52 thereof) may retrieve segment 124A. As another example, if quality values 136B indicate that segment 132B has a higher quality than segment 124B, client device 40 or retrieval unit 52 may retrieve segment 132B.

Figure 4:
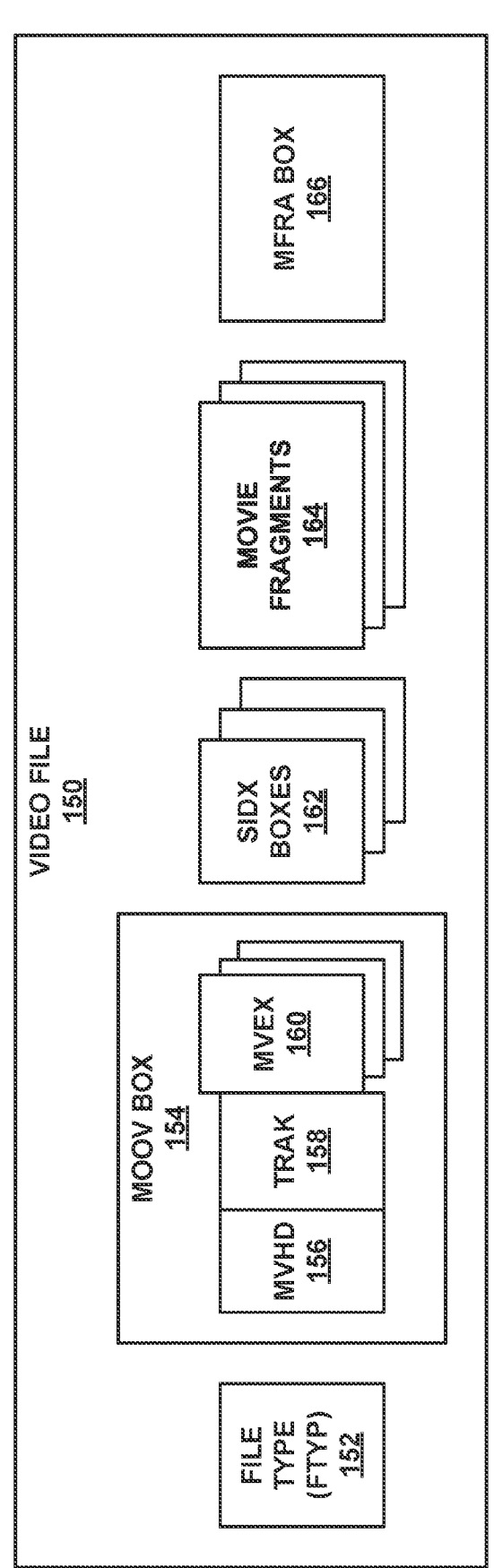
FIG. 4 is a block diagram illustrating elements of an example video file.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
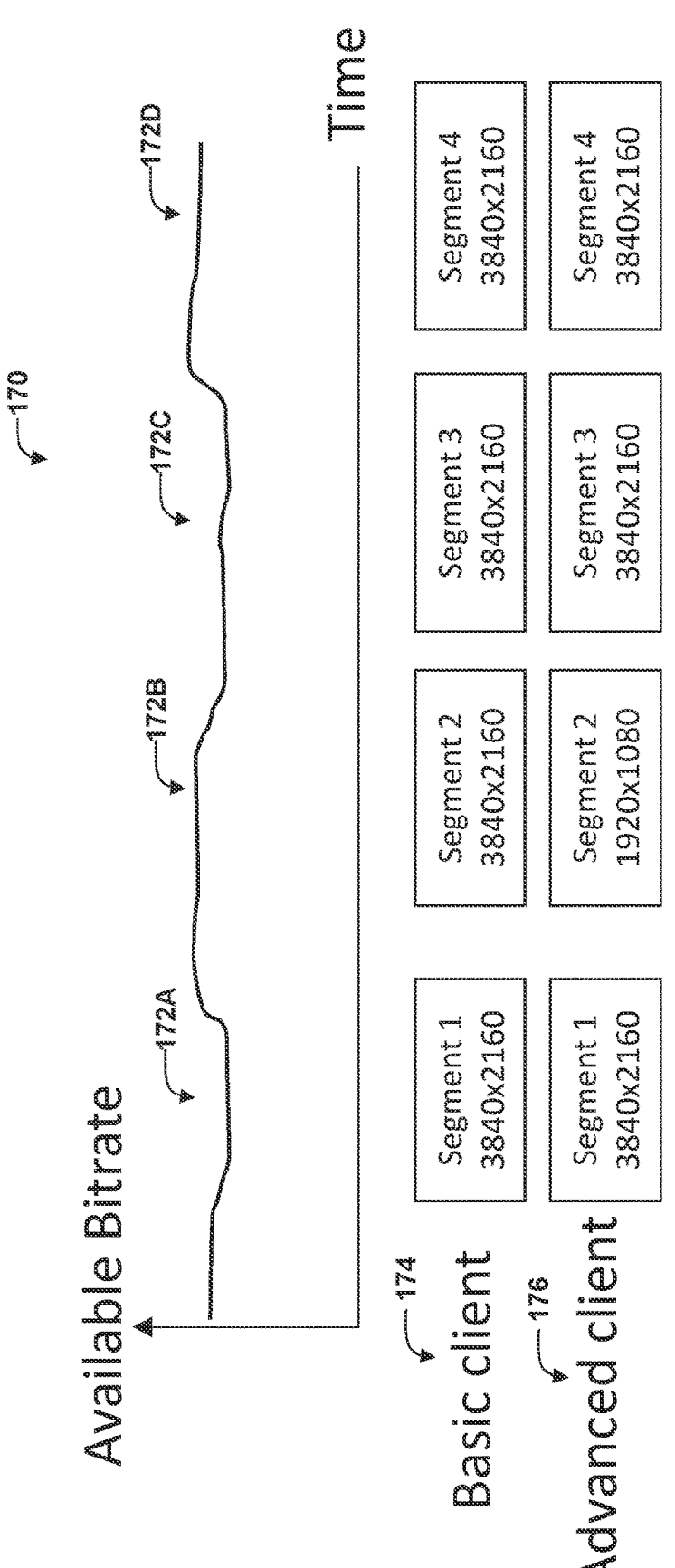
FIG. 5 is a conceptual diagram illustrating examples of retrieval techniques according to the techniques of this disclosure.

FIG. 5 is a conceptual diagram illustrating examples of retrieval techniques according to the techniques of this disclosure. In particular, graph 170 depicts available bitrates over time during which segments of media data can be retrieved at times 172A-172D (times 172). In a first example shown in FIG. 5, basic client 174 retrieves segments for each of times 172 at 4K resolution. Basic client 174 is considered "basic" in the sense that basic client 174 does not implement the techniques of this disclosure. Signaling of quality values in an ARI track according to the techniques of this disclosure is therefore backwards compatible with client devices that are not configured to perform these techniques.

However, in another example, advanced client 176 is configured to perform the techniques of this disclosure. In this example, at times 172A, 172C, and 172D, advanced client 176 determines that segments at 4K resolution have higher quality values. However, for time 172B, advanced client 176 determines that a segment having 1080p resolution is higher quality (e.g., using an ARI track signaling quality values for the segments). Thus, advanced client 176 instead retrieves the segment from the resolution having 1080p resolution.

Figure 6:
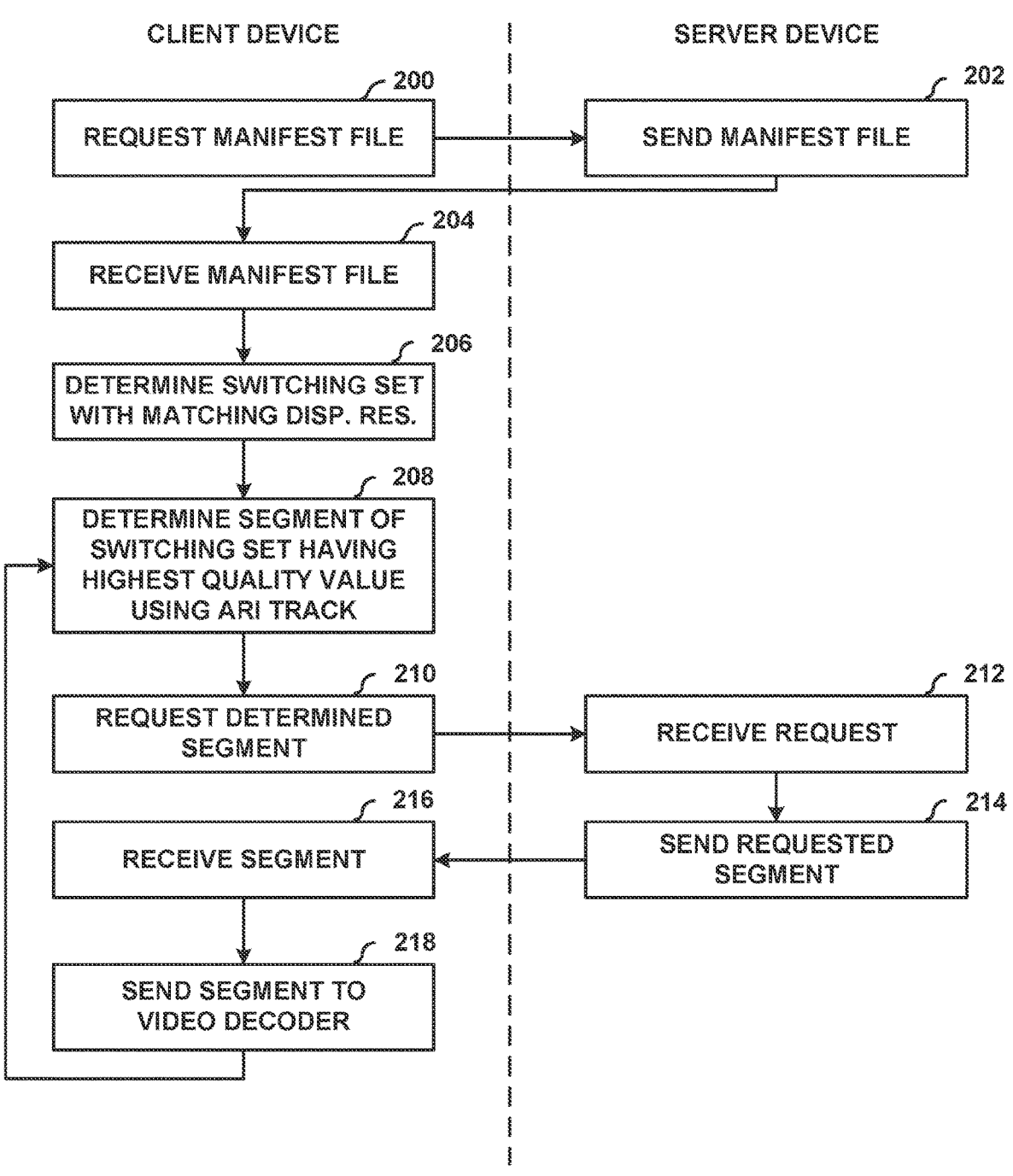
FIG. 6 is a flowchart illustrating an example method of retrieving media data according to the techniques of this disclosure.

FIG. 6 is a flowchart illustrating an example method of retrieving media data according to the techniques of this disclosure. The method of FIG. 6 is explained with respect to client device 40 and server device 60 of FIG. 1 for purposes of example and explanation.

Initially, client device 40 may request a manifest file for a media presentation (200). Client device 40 may, for example, send an HTTP GET request to server device 60 including a URL for the manifest file. In response, server device 60 may send the requested manifest file to client device 40 (202).

Client device 40 may then receive the manifest file (204). Using the manifest file, client device 40 may determine a switching set having a matching display resolution for a display of client device 40 (e.g., video output 44) (206). The switching set may have a matching display resolution in the sense that the switching set includes representations having encoded resolutions equal to or less than the display resolution of the display for client device 40.

Client device 40 may further receive and process an addressable resource index (ARI) track for the switching set. Throughout streaming and playback of media data for the selected switching set, client device 40 may use data of the ARI track to determine quality values for temporally aligned segments of a particular presentation time. Client device 40 may then, for a particular presentation time, determine a segment (or chunk) having a highest quality value using the quality values of the ARI track (208). Client device 40 may request the determined segment (210). For example, client device 40 may construct an HTTP GET request specifying a URL of the determined segment and send the HTTP GET request to server device 60. Server device 60 may, in turn, receive the request (212) and send the requested segment to client device 40 (214).

Alternatively, client device 40 may receive a broadcast media stream including two or more representations or other sets of video data having different spatial resolutions. As discussed with respect to FIG. 2, DVB middleware unit 100 may cache the received video data. Actions attributed to server device 60 above may instead be performed by proxy server unit 102. That is, DASH client 110 may retrieve a determined segment (having a highest quality value as indicated by the ARI track) from proxy server unit 102 proxy server unit 102.

Client device 40 may then receive the segment (216) and send video data of the segment to video decoder 48 (218).

In this manner, the method of FIG. 6 represents an example of a method of retrieving video data including determining that a media presentation includes first video data at a first spatial resolution and second video data at a second spatial resolution, the second spatial resolution being different than the first spatial resolution; receiving a first portion of the first video data at the first spatial resolution for a first playback time; sending the first portion of the first video data at the first spatial resolution to a video decoder; receiving a second portion of the second video data at the second spatial resolution for a second playback time later than the first playback time; and sending the second portion of the second video data at the second spatial resolution to the video decoder.

Various examples of the techniques of this disclosure are summarized in the following clauses:

Clause 1: A method of receiving media data, the method comprising: determining that a media presentation includes first video data at a first spatial resolution and second video data at a second spatial resolution, the second spatial resolution being different than the first spatial resolution; receiving a first portion of the first video data at the first spatial resolution for a first playback time; sending the first portion of the first video data at the first spatial resolution to a video decoder; receiving a second portion of the second video data at the second spatial resolution for a second playback time later than the first playback time; and sending the second portion of the second video data at the second spatial resolution to the video decoder.

Clause 2: The method of clause 1, further comprising: receiving an addressable resource index (ARI) track for the media presentation, the ARI track including data representing a first quality for the first video data at the first spatial resolution for the first playback time and a second quality of the second video data at the second spatial resolution for the first playback time; and determining that the first quality is higher than the second quality, wherein receiving the first portion of the first video data at the first spatial resolution for the first playback time comprises, in response to determining that the first quality is higher than the second quality, retrieving the first portion of the first video data at the first spatial resolution for the first playback time instead of the second video data at the second spatial resolution for the first playback time.

Clause 3: The method of clause 2, wherein the second spatial resolution is higher than the first spatial resolution.

Clause 4: The method of clause 2, wherein the first video data at the first spatial resolution for the first playback time has a bitrate that is equal to the second video data at the second spatial resolution for the first playback time.

Clause 5: The method of clause 2, wherein the first quality and the second quality represent one or more quality measurements other than spatial resolution and bitrate.

Clause 6: The method of clause 2, wherein the ARI track further includes data representing a third quality for the first video data at the first spatial resolution at the second playback time and a fourth quality for the second video data at the second spatial resolution at the second playback time, the method further comprising determining that the fourth quality is higher than the third quality, wherein receiving the second portion of the second video data at the second spatial resolution for the second playback time comprises, in response to determining that the fourth quality is higher than the third quality, retrieving the second portion of the second video data at the second spatial resolution for the second playback time instead of the first video data at the first spatial resolution for the second playback time.

Clause 7: The method of clause 6, wherein the first spatial resolution is higher than the second spatial resolution.

Clause 8: The method of clause 6, wherein the first video data at the first spatial resolution for the second playback time has a bitrate that is equal to the second video data at the second spatial resolution for the second playback time.

Clause 9: The method of clause 6, wherein the third quality and the fourth quality represent one or more quality measurements other than spatial resolution and bitrate.

Clause 10: The method of clause 1, wherein the media presentation includes a first representation including the first video data at the first spatial resolution and a second representation including the second video data at the second spatial resolution, and wherein the media presentation includes a switching set including both the first representation and the second representation.

Clause 11: The method of clause 1, wherein receiving the first portion of the first video data at the first spatial resolution for the first playback time comprises receiving, by a middleware unit, the first portion of the first video data at the first spatial resolution for the first playback time via broadcast, the method further comprising: caching, by the middleware unit, the first portion of the first video data at the first spatial resolution for the first playback time; and retrieving, by a dynamic adaptive streaming over HTTP (DASH) client, the first portion of the first video data at the first spatial resolution for the first playback time from the middleware unit.

Clause 12: The method of clause 1, wherein receiving the second portion of the second video data at the second spatial resolution for the second playback time comprises receiving, by a middleware unit, the second portion of the second video data at the second spatial resolution for the second playback time via broadcast, the method further comprising: caching, by the middleware unit, the second portion of the second video data at the second spatial resolution for the second playback time; and retrieving, by a dynamic adaptive streaming over HTTP (DASH) client, the second portion of the second video data at the second spatial resolution for the second playback time from the middleware unit.

Clause 13: A device for retrieving media data, the device comprising: a memory configured to store video data; a video decoder configured to decode the video data; and one or more processors implemented in circuitry and configured to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to the video decoder; receive a second portion of the second video data at the second spatial resolution for a second playback time later than the first playback time; and send the second portion of the second video data at the second spatial resolution to the video decoder.

Clause 14: The device of clause 13, wherein the one or more processors are further configured to: receive an addressable resource index (ARI) track for the media presentation, the ARI track including data representing a first quality for the first video data at the first spatial resolution for the first playback time and a second quality of the second video data at the second spatial resolution for the first playback time; and determine that the first quality is higher than the second quality, wherein the one or more processors are configured to, in response to determining that the first quality is higher than the second quality, retrieve the first portion of the first video data at the first spatial resolution for the first playback time instead of the second video data at the second spatial resolution for the first playback time.

Clause 15: The device of clause 14, wherein the second spatial resolution is higher than the first spatial resolution.

Clause 16: The device of clause 14, wherein the first video data at the first spatial resolution for the first playback time has a bitrate that is equal to the second video data at the second spatial resolution for the first playback time.

Clause 17: The device of clause 14, wherein the first quality and the second quality represent one or more quality measurements other than spatial resolution and bitrate.

Clause 18: The device of clause 14, wherein the ARI track further includes data representing a third quality for the first video data at the first spatial resolution at the second playback time and a fourth quality for the second video data at the second spatial resolution at the second playback time, and wherein the one or more processors are further configured to determine that the fourth quality is higher than the third quality, wherein the one or more processors are configured to, in response to determining that the fourth quality is higher than the third quality, retrieve the second portion of the second video data at the second spatial resolution for the second playback time instead of the first video data at the first spatial resolution for the second playback time.

Clause 19: The device of clause 18, wherein the first spatial resolution is higher than the second spatial resolution.

Clause 20: The device of clause 18, wherein the first video data at the first spatial resolution for the second playback time has a bitrate that is equal to the second video data at the second spatial resolution for the second playback time.

Clause 21: The device of clause 18, wherein the third quality and the fourth quality represent one or more quality measurements other than spatial resolution and bitrate.

Clause 22: The device of clause 13, wherein the media presentation includes a first representation including the first video data at the first spatial resolution and a second representation including the second video data at the second spatial resolution, and wherein the media presentation includes a switching set including both the first representation and the second representation.

Clause 23: The device of clause 13, further comprising a middleware unit configured to receive the first portion of the first video data at the first spatial resolution for the first playback time via broadcast and to cache first portion of the first video data at the first spatial resolution for the first playback time via broadcast, wherein the one or more processors are configured to execute a dynamic adaptive streaming over HTTP (DASH) client to retrieve the first portion of the first video data at the first spatial resolution for the first playback time from the middleware unit.

Clause 24: The device of clause 13, further comprising a middleware unit configured to receive the second portion of the second video data at the second spatial resolution for the second playback time via broadcast and to cache second portion of the second video data at the second spatial resolution for the second playback time via broadcast, wherein the one or more processors are configured to execute a dynamic adaptive streaming over HTTP (DASH) client to retrieve the second portion of the second video data at the second spatial resolution for the second playback time from the middleware unit.

Clause 25: The device of clause 13, wherein the apparatus comprises at least one of: an integrated circuit; a microprocessor; and a wireless communication device.

Clause 26: A computer-readable storage medium having stored thereon instructions that, when executed, cause a processor to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to a video decoder; receive a second portion of the second video data at the second spatial resolution for a second playback time later than the first playback time; and send the second portion of the second video data at the second spatial resolution to the video decoder.

Clause 27: The computer-readable storage medium of clause 26, further comprising instructions that cause the processor to: receive an addressable resource index (ARI) track for the media presentation, the ARI track including data representing a first quality for the first video data at the first spatial resolution for the first playback time and a second quality of the second video data at the second spatial resolution for the first playback time; and determine that the first quality is higher than the second quality, wherein the instructions that cause the processor to receive the first portion of the first video data at the first spatial resolution for the first playback time comprise instructions that cause the processor to, in response to determining that the first quality is higher than the second quality, retrieve the first portion of the first video data at the first spatial resolution for the first playback time instead of the second video data at the second spatial resolution for the first playback time.

Clause 28: The computer-readable storage medium of clause 27, wherein the second spatial resolution is higher than the first spatial resolution.

Clause 29: The computer-readable storage medium of clause 27, wherein the first video data at the first spatial resolution for the first playback time has a bitrate that is equal to the second video data at the second spatial resolution for the first playback time.

Clause 30: The computer-readable storage medium of clause 27, wherein the first quality and the second quality represent one or more quality measurements other than spatial resolution and bitrate.

Clause 31: The computer-readable storage medium of clause 27, wherein the ARI track further includes data representing a third quality for the first video data at the first spatial resolution at the second playback time and a fourth quality for the second video data at the second spatial resolution at the second playback time, the further comprising instructions that cause the processor to determine that the fourth quality is higher than the third quality, wherein the instructions that cause the processor to receive the second portion of the second video data at the second spatial resolution for the second playback time comprise instructions that cause the processor to, in response to determining that the fourth quality is higher than the third quality, retrieve the second portion of the second video data at the second spatial resolution for the second playback time instead of the first video data at the first spatial resolution for the second playback time.

Clause 32: The computer-readable storage medium of clause 31, wherein the first spatial resolution is higher than the second spatial resolution.

Clause 33: The computer-readable storage medium of clause 31, wherein the first video data at the first spatial resolution for the second playback time has a bitrate that is equal to the second video data at the second spatial resolution for the second playback time.

Clause 34: The computer-readable storage medium of clause 31, wherein the third quality and the fourth quality represent one or more quality measurements other than spatial resolution and bitrate.

Clause 35: The computer-readable storage medium of clause 26, wherein the media presentation includes a first representation including the first video data at the first spatial resolution and a second representation including the second video data at the second spatial resolution, and wherein the media presentation includes a switching set including both the first representation and the second representation.

Clause 36: The computer-readable storage medium of clause 26, wherein the instructions that cause the processor to receive the first portion of the first video data at the first spatial resolution for the first playback time comprise instructions that cause the processor to retrieve the first portion of the first video data at the first spatial resolution for the first playback time from a middleware unit.

Clause 37: The computer-readable storage medium of clause 26, wherein the instructions that cause the processor to receive the second portion of the second video data at the second spatial resolution for the second playback time comprise instructions that cause the processor to retrieve the second portion of the second video data at the second spatial resolution for the second playback time from a middleware unit.

Clause 38: A device for retrieving media data, the device comprising: means for determining that a media presentation includes first video data at a first spatial resolution and second video data at a second spatial resolution, the second spatial resolution being different than the first spatial resolution; means for receiving a first portion of the first video data at the first spatial resolution for a first playback time; means for sending the first portion of the first video data at the first spatial resolution to a video decoder; means for receiving a second portion of the second video data at the second spatial resolution for a second playback time later than the first playback time; and means for sending the second portion of the second video data at the second spatial resolution to the video decoder.

Clause 39: A method of receiving media data, the method comprising: determining that a media presentation includes first video data at a first spatial resolution and second video data at a second spatial resolution, the second spatial resolution being different than the first spatial resolution; receiving a first portion of the first video data at the first spatial resolution for a first playback time; sending the first portion of the first video data at the first spatial resolution to a video decoder; receiving a second portion of the second video data at the second spatial resolution for a second playback time later than the first playback time; and sending the second portion of the second video data at the second spatial resolution to the video decoder.

Clause 40: The method of clause 39, further comprising: receiving an addressable resource index (ARI) track for the media presentation, the ARI track including data representing a first quality for the first video data at the first spatial resolution for the first playback time and a second quality of the second video data at the second spatial resolution for the first playback time; and determining that the first quality is higher than the second quality, wherein receiving the first portion of the first video data at the first spatial resolution for the first playback time comprises, in response to determining that the first quality is higher than the second quality, retrieving the first portion of the first video data at the first spatial resolution for the first playback time instead of the second video data at the second spatial resolution for the first playback time.

Clause 41: The method of clause 40, wherein the second spatial resolution is higher than the first spatial resolution.

Clause 42: The method of any of clauses 40 and 41, wherein the first video data at the first spatial resolution for the first playback time has a bitrate that is equal to the second video data at the second spatial resolution for the first playback time.

Clause 43: The method of any of clauses 40-42, wherein the first quality and the second quality represent one or more quality measurements other than spatial resolution and bitrate.

Clause 44: The method of clause 40, wherein the ARI track further includes data representing a third quality for the first video data at the first spatial resolution at the second playback time and a fourth quality for the second video data at the second spatial resolution at the second playback time, the method further comprising determining that the fourth quality is higher than the third quality, wherein receiving the second portion of the second video data at the second spatial resolution for the second playback time comprises, in response to determining that the fourth quality is higher than the third quality, retrieving the second portion of the second video data at the second spatial resolution for the second playback time instead of the first video data at the first spatial resolution for the second playback time.

Clause 45: The method of clause 44, wherein the first spatial resolution is higher than the second spatial resolution.

Clause 46: The method of any of clauses 44 and 45, wherein the first video data at the first spatial resolution for the second playback time has a bitrate that is equal to the second video data at the second spatial resolution for the second playback time.

Clause 47: The method of any of clauses 44-46, wherein the third quality and the fourth quality represent one or more quality measurements other than spatial resolution and bitrate.

Clause 48: The method of any of clauses 39-47, wherein the media presentation includes a first representation including the first video data at the first spatial resolution and a second representation including the second video data at the second spatial resolution, and wherein the media presentation includes a switching set including both the first representation and the second representation.

Clause 49: The method of any of clauses 39-48, wherein receiving the first portion of the first video data at the first spatial resolution for the first playback time comprises receiving, by a middleware unit, the first portion of the first video data at the first spatial resolution for the first playback time via broadcast, the method further comprising: caching, by the middleware unit, the first portion of the first video data at the first spatial resolution for the first playback time; and retrieving, by a dynamic adaptive streaming over HTTP (DASH) client, the first portion of the first video data at the first spatial resolution for the first playback time from the middleware unit.

Clause 50: The method of any of clauses 39-49, wherein receiving the second portion of the second video data at the second spatial resolution for the second playback time comprises receiving, by a middleware unit, the second portion of the second video data at the second spatial resolution for the second playback time via broadcast, the method further comprising: caching, by the middleware unit, the second portion of the second video data at the second spatial resolution for the second playback time; and retrieving, by a dynamic adaptive streaming over HTTP (DASH) client, the second portion of the second video data at the second spatial resolution for the second playback time from the middleware unit.

Clause 51: A device for retrieving media data, the device comprising: a memory configured to store video data; a video decoder configured to decode the video data; and one or more processors implemented in circuitry and configured to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to the video decoder; receive a second portion of the second video data at the second spatial resolution for a second playback time later than the first playback time; and send the second portion of the second video data at the second spatial resolution to the video decoder.

Clause 52: The device of clause 51, wherein the one or more processors are further configured to: receive an addressable resource index (ARI) track for the media presentation, the ARI track including data representing a first quality for the first video data at the first spatial resolution for the first playback time and a second quality of the second video data at the second spatial resolution for the first playback time; and determine that the first quality is higher than the second quality, wherein the one or more processors are configured to, in response to determining that the first quality is higher than the second quality, retrieve the first portion of the first video data at the first spatial resolution for the first playback time instead of the second video data at the second spatial resolution for the first playback time.

Clause 53: The device of clause 52, wherein the second spatial resolution is higher than the first spatial resolution.

Clause 54: The device of any of clauses 52 and 53, wherein the first video data at the first spatial resolution for the first playback time has a bitrate that is equal to the second video data at the second spatial resolution for the first playback time.

Clause 55: The device of any of clauses 52-54, wherein the first quality and the second quality represent one or more quality measurements other than spatial resolution and bitrate.

Clause 56: The device of any of clauses 52-55, wherein the ARI track further includes data representing a third quality for the first video data at the first spatial resolution at the second playback time and a fourth quality for the second video data at the second spatial resolution at the second playback time, and wherein the one or more processors are further configured to determine that the fourth quality is higher than the third quality, wherein the one or more processors are configured to, in response to determining that the fourth quality is higher than the third quality, retrieve the second portion of the second video data at the second spatial resolution for the second playback time instead of the first video data at the first spatial resolution for the second playback time.

Clause 57: The device of clause 56, wherein the first spatial resolution is higher than the second spatial resolution.

Clause 58: The device of any of clauses 56 and 57, wherein the first video data at the first spatial resolution for the second playback time has a bitrate that is equal to the second video data at the second spatial resolution for the second playback time.

Clause 59: The device of any of clauses 56-58, wherein the third quality and the fourth quality represent one or more quality measurements other than spatial resolution and bitrate.

Clause 60: The device of any of clauses 51-59, wherein the media presentation includes a first representation including the first video data at the first spatial resolution and a second representation including the second video data at the second spatial resolution, and wherein the media presentation includes a switching set including both the first representation and the second representation.

Clause 61: The device of any of clauses 51-60, further comprising a middleware unit configured to receive the first portion of the first video data at the first spatial resolution for the first playback time via broadcast and to cache first portion of the first video data at the first spatial resolution for the first playback time via broadcast, wherein the one or more processors are configured to execute a dynamic adaptive streaming over HTTP (DASH) client to retrieve the first portion of the first video data at the first spatial resolution for the first playback time from the middleware unit.

Clause 62: The device of any of clauses 51-61, further comprising a middleware unit configured to receive the second portion of the second video data at the second spatial resolution for the second playback time via broadcast and to cache second portion of the second video data at the second spatial resolution for the second playback time via broadcast, wherein the one or more processors are configured to execute a dynamic adaptive streaming over HTTP (DASH) client to retrieve the second portion of the second video data at the second spatial resolution for the second playback time from the middleware unit.

Clause 63: The device of any of clauses 51-62, wherein the device comprises at least one of: an integrated circuit; a microprocessor; and a wireless communication device.

Clause 64: A computer-readable storage medium having stored thereon instructions that, when executed, cause a processor to: determine that a media presentation includes first video data at a first spatial resolution and second video data at a second spatial resolution, the second spatial resolution being different than the first spatial resolution; receive a first portion of the first video data at the first spatial resolution for a first playback time; send the first portion of the first video data at the first spatial resolution to a video decoder; receive a second portion of the second video data at the second spatial resolution for a second playback time later than the first playback time; and send the second portion of the second video data at the second spatial resolution to the video decoder.

Clause 65: The computer-readable storage medium of clause 64, further comprising instructions that cause the processor to: receive an addressable resource index (ARI) track for the media presentation, the ARI track including data representing a first quality for the first video data at the first spatial resolution for the first playback time and a second quality of the second video data at the second spatial resolution for the first playback time; and determine that the first quality is higher than the second quality, wherein the instructions that cause the processor to receive the first portion of the first video data at the first spatial resolution for the first playback time comprise instructions that cause the processor to, in response to determining that the first quality is higher than the second quality, retrieve the first portion of the first video data at the first spatial resolution for the first playback time instead of the second video data at the second spatial resolution for the first playback time.

Clause 66: The computer-readable storage medium of clause 65, wherein the second spatial resolution is higher than the first spatial resolution.

Clause 67: The computer-readable storage medium of any of clause 65 and 66, wherein the first video data at the first spatial resolution for the first playback time has a bitrate that is equal to the second video data at the second spatial resolution for the first playback time.

Clause 68: The computer-readable storage medium of any of clauses 65-67, wherein the first quality and the second quality represent one or more quality measurements other than spatial resolution and bitrate.

Clause 69: The computer-readable storage medium of any of clauses 65-68, wherein the ARI track further includes data representing a third quality for the first video data at the first spatial resolution at the second playback time and a fourth quality for the second video data at the second spatial resolution at the second playback time, the further comprising instructions that cause the processor to determine that the fourth quality is higher than the third quality, wherein the instructions that cause the processor to receive the second portion of the second video data at the second spatial resolution for the second playback time comprise instructions that cause the processor to, in response to determining that the fourth quality is higher than the third quality, retrieve the second portion of the second video data at the second spatial resolution for the second playback time instead of the first video data at the first spatial resolution for the second playback time.

Clause 70: The computer-readable storage medium of clause 69, wherein the first spatial resolution is higher than the second spatial resolution.

Clause 71: The computer-readable storage medium of any of clauses 69 and 70, wherein the first video data at the first spatial resolution for the second playback time has a bitrate that is equal to the second video data at the second spatial resolution for the second playback time.

Clause 72: The computer-readable storage medium of any of clauses 69-71, wherein the third quality and the fourth quality represent one or more quality measurements other than spatial resolution and bitrate.

Clause 73: The computer-readable storage medium of any of clauses 65-72, wherein the media presentation includes a first representation including the first video data at the first spatial resolution and a second representation including the second video data at the second spatial resolution, and wherein the media presentation includes a switching set including both the first representation and the second representation.

Clause 74: The computer-readable storage medium of any of clauses 65-73, wherein the instructions that cause the processor to receive the first portion of the first video data at the first spatial resolution for the first playback time comprise instructions that cause the processor to retrieve the first portion of the first video data at the first spatial resolution for the first playback time from a middleware unit.

Clause 75: The computer-readable storage medium of any of clauses 65-74, wherein the instructions that cause the processor to receive the second portion of the second video data at the second spatial resolution for the second playback time comprise instructions that cause the processor to retrieve the second portion of the second video data at the second spatial resolution for the second playback time from a middleware unit.

Clause 76: A device for retrieving media data, the device comprising: means for determining that a media presentation includes first video data at a first spatial resolution and second video data at a second spatial resolution, the second spatial resolution being different than the first spatial resolution; means for receiving a first portion of the first video data at the first spatial resolution for a first playback time; means for sending the first portion of the first video data at the first spatial resolution to a video decoder; means for receiving a second portion of the second video data at the second spatial resolution for a second playback time later than the first playback time; and means for sending the second portion of the second video data at the second spatial resolution to the video decoder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving media data, the method comprising:
  determining that a media presentation includes first video data at a first spatial resolution and second video data at a second spatial resolution, the second spatial resolution being different than the first spatial resolution;
  receiving data associated with the media presentation, the data including:
    a first quality value indicating a first quality of a first portion of the first video data at the first spatial resolution for a first playback time, and
    a second quality value indicating a second quality of a first portion of the second video data at the second spatial resolution for the first playback time;
  determining, based on the first quality value received in the data and the second quality value received in the data, that the first quality of the first portion of the first video data associated with the first playback time is higher than the second quality of the first portion of the second video data associated with the first playback time, wherein the first portion of the first video data and the first portion of the second video data are alternative encoded versions to each other of content included within the media presentation;
  in response to determining that the first quality of the first portion of the first video data is higher than the second quality of the first portion of the second video data, requesting the first portion of the first video data for the first playback time;
  receiving the first portion of the first video data at the first spatial resolution for the first playback time;
  sending the first portion of the first video data at the first spatial resolution to a video decoder;
  receiving a second portion of the second video data at the second spatial resolution for a second playback time later than the first playback time; and
  sending the second portion of the second video data at the second spatial resolution to the video decoder.

2. The method of claim 1, wherein the second spatial resolution is higher than the first spatial resolution.

3. The method of claim 2, wherein the first video data at the first spatial resolution for the first playback time has a bitrate that is equal to the second video data at the second spatial resolution for the first playback time.

4. The method of claim 2, wherein the first quality and the second quality represent one or more quality metrics, the one or more quality metrics not including either spatial resolution or bitrate.

5. The method of claim 2, wherein the data further indicates a third quality of a second portion of the first video data at the first spatial resolution for the second playback time and indicates a fourth quality of the second portion of the second video data at the second spatial resolution for the second playback time, the method further comprising:
  determining, based on the data, that the fourth quality of the second portion of the second video data is higher than the third quality of the second portion of the first video data;
in response to determining that the fourth quality of the second portion of the second video data is higher than the third quality of the second portion of the first video data, requesting the second portion of the second video data for the second playback time.

6. The method of claim 5, wherein the first video data at the first spatial resolution for the second playback time has a bitrate that is equal to the second video data at the second spatial resolution for the second playback time.

7. The method of claim 5, wherein the third quality and the fourth quality represent one or more quality metrics, the one or more quality metrics not including either spatial resolution or bitrate.

8. The method of claim 1, wherein the media presentation includes a first representation including the first video data at the first spatial resolution and a second representation including the second video data at the second spatial resolution, and wherein the media presentation includes a switching set including both the first representation and the second representation.

9. The method of claim 1, wherein receiving the first portion of the first video data at the first spatial resolution for the first playback time comprises receiving, by a middleware unit, the first portion of the first video data at the first spatial resolution for the first playback time via broadcast, the method further comprising:
  caching, by the middleware unit, the first portion of the first video data at the first spatial resolution for the first playback time; and
  retrieving, by a dynamic adaptive streaming over HTTP (DASH) client, the first portion of the first video data at the first spatial resolution for the first playback time from the middleware unit.

10. The method of claim 1, wherein receiving the second portion of the second video data at the second spatial resolution for the second playback time comprises receiving, by a middleware unit, the second portion of the second video data at the second spatial resolution for the second playback time via broadcast, the method further comprising:
  caching, by the middleware unit, the second portion of the second video data at the second spatial resolution for the second playback time; and
  retrieving, by a dynamic adaptive streaming over HTTP (DASH) client, the second portion of the second video data at the second spatial resolution for the second playback time from the middleware unit.

11. A device for retrieving media data, the device comprising:
  a memory configured to store video data;
    a video decoder configured to decode the video data; and one or more processors implemented in circuitry and configured to:

determine that a media presentation includes first video data at a first spatial resolution and second video data at a second spatial resolution, the second spatial resolution being different than the first spatial resolution;

receive data associated with the media presentation, the data including:

a first quality value indicating a first quality of a first portion of the first video data at the first spatial resolution for a first playback time, and a second quality value indicating a second quality of a first portion of the second video data at the second spatial resolution for the first playback time;

determine, based on the first quality value received in the data and the second quality value received in the data, that the first quality of the first portion of the first video data associated with the first playback time is higher than the second quality of the first portion of the second video data associated with the first playback time, wherein the first portion of the first video data and the first portion of the second video data are alternative encoded versions to each other of content included within the media presentation;

in response to a determination that the first quality of the first portion of the first video data is higher than the second quality of the first portion of the second video data, request the first portion of the first video data for the first playback time;

receive the first portion of the first video data at the first spatial resolution for the first playback time;

send the first portion of the first video data at the first spatial resolution to the video decoder;

receive a second portion of the second video data at the second spatial resolution for a second playback time later than the first playback time; and send the second portion of the second video data at the second spatial resolution to the video decoder.

12. The device of claim 11, wherein the second spatial resolution is higher than the first spatial resolution.

13. The device of claim 11, wherein the first video data at the first spatial resolution for the first playback time has a bitrate that is equal to the second video data at the second spatial resolution for the first playback time.

14. The device of claim 11, wherein the first quality and the second quality represent one or more quality metrics, the one or more quality metrics not including either spatial resolution or bitrate.

15. The device of claim 11, wherein the data further indicates a third quality of a second portion of the first video data at the first spatial resolution for the second playback time and indicates a fourth quality of the second portion of the second video data at the second spatial resolution for the second playback time, and wherein the one or more processors are further configured to:

determine, based on the data, that the fourth quality of the second portion of the second video data is higher than the third quality of the second portion of the first video data;

in response to a determination that the fourth quality of the second portion of the second video data is higher than the third quality of the second portion of the first video data, request the second portion of the second video data for the second playback time.

16. The device of claim 15, wherein the first video data at the first spatial resolution for the second playback time has a bitrate that is equal to the second video data at the second spatial resolution for the second playback time.

17. The device of claim 15, wherein the third quality and the fourth quality represent one or more quality metrics, the one or more quality metrics not including either spatial resolution or bitrate.

18. The device of claim 11, wherein the media presentation includes a first representation including the first video data at the first spatial resolution and a second representation including the second video data at the second spatial resolution, and wherein the media presentation includes a switching set including both the first representation and the second representation.

19. The device of claim 11, further comprising a middleware unit comprising executable instructions stored in memory and executed by the one or more processors implemented in circuitry, the middleware unit being configured to receive the first portion of the first video data at the first spatial resolution for the first playback time via broadcast and to cache first portion of the first video data at the first spatial resolution for the first playback time via broadcast, wherein the one or more processors are configured to execute a dynamic adaptive streaming over HTTP (DASH) client to retrieve the first portion of the first video data at the first spatial resolution for the first playback time from the middleware unit.

20. The device of claim 11, further comprising a middleware unit comprising executable instructions stored in memory and executed by the one or more processors implemented in circuitry, the middleware unit being configured to receive the second portion of the second video data at the second spatial resolution for the second playback time via broadcast and to cache second portion of the second video data at the second spatial resolution for the second playback time via broadcast, wherein the one or more processors are configured to execute a dynamic adaptive streaming over HTTP (DASH) client to retrieve the second portion of the second video data at the second spatial resolution for the second playback time from the middleware unit.

21. The device of claim 11, wherein the device comprises at least one of:

an integrated circuit;

a microprocessor; and a wireless communication device.

22. A non-transitory, computer-readable storage medium having stored thereon instructions that, when executed, cause a processor to:

determine that a media presentation includes first video data at a first spatial resolution and second video data at a second spatial resolution, the second spatial resolution being different than the first spatial resolution;

receive data associated with the media presentation, the data including:

a first quality value indicating a first quality of a first portion of the first video data at the first spatial resolution for a first playback time, and a second quality value indicating a second quality of a first portion of the second video data at the second spatial resolution for the first playback time;

determine, based on the first quality value received in the data and the second quality value received in the data, that the first quality of the first portion of the first video data associated with the first playback time is higher than the second quality of the first portion of the second video data associated with the first playback time, wherein the first portion of the first video data and the first portion of the second video data are alternative encoded versions to each other of content included within the media presentation;

in response to a determination that the first quality of the first portion of the first video data is higher than the second quality of the first portion of the second video data, request the first portion of the first video data for the first playback time;

receive the first portion of the first video data at the first spatial resolution for the first playback time;

send the first portion of the first video data at the first spatial resolution to a video decoder;

receive a second portion of the second video data at the second spatial resolution for a second playback time later than the first playback time; and send the second portion of the second video data at the second spatial resolution to the video decoder.

23. The non-transitory, computer-readable storage medium of claim 22, wherein the second spatial resolution is higher than the first spatial resolution.

24. The non-transitory, computer-readable storage medium of claim 22, wherein the first video data at the first spatial resolution for the first playback time has a bitrate that is equal to the second video data at the second spatial resolution for the first playback time.

25. The non-transitory, computer-readable storage medium of claim 22, wherein the first quality and the second quality represent one or more quality metrics, the one or more quality metrics not including either spatial resolution or bitrate.

26. The non-transitory, computer-readable storage medium of claim 22, wherein the data further indicates a third quality of a second portion of the first video data at the first spatial resolution for the second playback time and indicates a fourth quality of the second portion of the second video data at the second spatial resolution for the second playback time, the further comprising instructions that cause the processor to:

determine, based on the data, that the fourth quality of the second portion of the second video data is higher than the third quality of the second portion of the first video data;

in response to a determination that the fourth quality of the second portion of the second video data is higher than the third quality of the second portion of the first video data, request the second portion of the second video data for the second playback.

27. The non-transitory, computer-readable storage medium of claim 26, wherein the first video data at the first spatial resolution for the second playback time has a bitrate that is equal to the second video data at the second spatial resolution for the second playback time.

28. The non-transitory, computer-readable storage medium of claim 26, wherein the third quality and the fourth quality represent one or more quality metrics, the one or more quality metrics not including either spatial resolution or bitrate.

29. The non-transitory, computer-readable storage medium of claim 22, wherein the media presentation includes a first representation including the first video data at the first spatial resolution and a second representation including the second video data at the second spatial resolution, and wherein the media presentation includes a switching set including both the first representation and the second representation.

30. The non-transitory, computer-readable storage medium of claim 22, wherein the instructions that cause the processor to receive the first portion of the first video data at the first spatial resolution for the first playback time comprise instructions that cause the processor to retrieve the first portion of the first video data at the first spatial resolution for the first playback time from a middleware unit.

31. The non-transitory, computer-readable storage medium of claim 22, wherein the instructions that cause the processor to receive the second portion of the second video data at the second spatial resolution for the second playback time comprise instructions that cause the processor to retrieve the second portion of the second video data at the second spatial resolution for the second playback time from a middleware unit.

32. A device for retrieving media data, the device comprising:

means for determining that a media presentation includes first video data at a first spatial resolution and second video data at a second spatial resolution, the second spatial resolution being different than the first spatial resolution;

means for receiving data associated with the media presentation, the data including:

a first quality value indicating a first quality of a first portion of the first video data at the first spatial resolution for a first playback time, and a second quality value indicating a second quality of a first portion of the second video data at the second spatial resolution for the first playback time;

means for determining, based on the first quality value received in the data and the second quality value received in the data, that the first quality of the first portion of the first video data associated with the first playback time is higher than the second quality of the first portion of the second video data associated with the first playback time, wherein the first portion of the first video data and the first portion of the second video data are alternative encoded versions to each other of content included within the media presentation;

in response to determining that the first quality of the first portion of the first video data is higher than the second quality of the first portion of the second video data, means for requesting the first portion of the first video data for the first playback time;

means for receiving the first portion of the first video data at the first spatial resolution for the first playback time;

means for sending the first portion of the first video data at the first spatial resolution to a video decoder;

means for receiving a second portion of the second video data at the second spatial resolution for a second playback time later than the first playback time; and means for sending the second portion of the second video data at the second spatial resolution to the video decoder.

* * * * *